United States Patent [19]

Campari

[11] 4,203,333

[45] May 20, 1980

[54] COAXIAL CABLE STRIPPING DEVICE

[75] Inventor: Luigi Campari, Turin, Italy

[73] Assignee: AMP Corporated, Harrisburg, Pa.

[21] Appl. No.: 948,446

[22] Filed: Oct. 4, 1978

Related U.S. Application Data

[63] Continuation of Ser. No. 812,926, Jul. 5, 1977, abandoned.

[30] Foreign Application Priority Data

Jul. 2, 1976 [GB] United Kingdom ............... 27556/76

[51] Int. Cl.² ............................................. H02G 1/12
[52] U.S. Cl. ..................................... 81/9.5 A; 30/90.1
[58] Field of Search ............ 30/90.1; 81/9.5 R, 9.5 A, 81/9.51

[56] References Cited

U.S. PATENT DOCUMENTS

| | | | |
|---|---|---|---|
| 3,165,013 | 1/1965 | Oehlerking | 81/9.51 |
| 3,330,036 | 7/1967 | Mahoney | 81/9.5 R |
| 3,596,540 | 8/1971 | Hooper | 81/9.5 A |
| 3,728,789 | 4/1973 | Fischer | 30/90.1 |

Primary Examiner—James G. Smith
Attorney, Agent, or Firm—Allan B. Osborne

[57] ABSTRACT

A device for stripping insulation from between inner and outer conductors of coaxial cables comprising means to support a coaxial cable with the axis of an end portion rectilinear and a tubular insulation engaging bit mounted in alignment with the support means for rotary and reciprocal rectilinear movement relative to the axis of the end portion. The bit has an external helical thread and is mounted in a cable-receiving channel in the support means. A cutting blade may be mounted for movement towards the channel mouth and for rotation about the cable axis.

3 Claims, 4 Drawing Figures

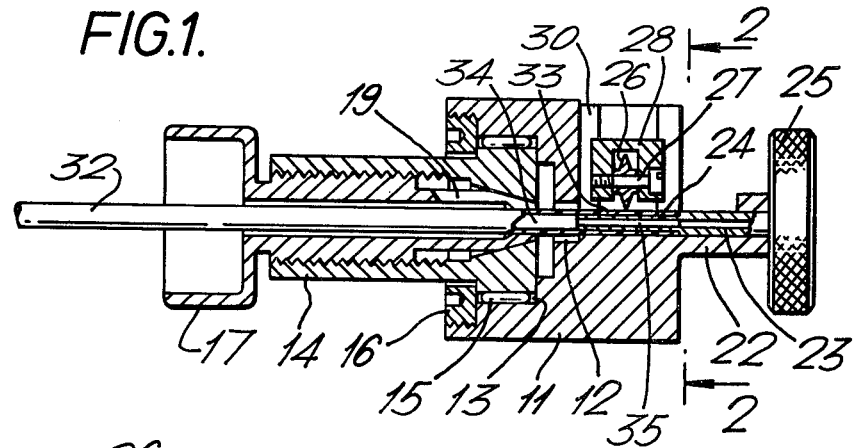
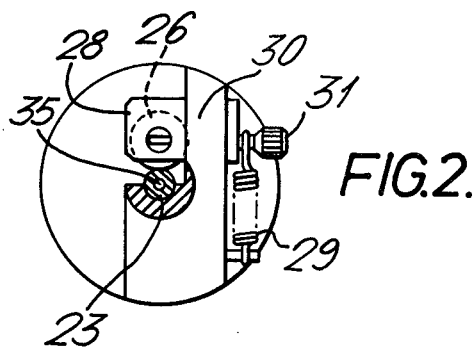
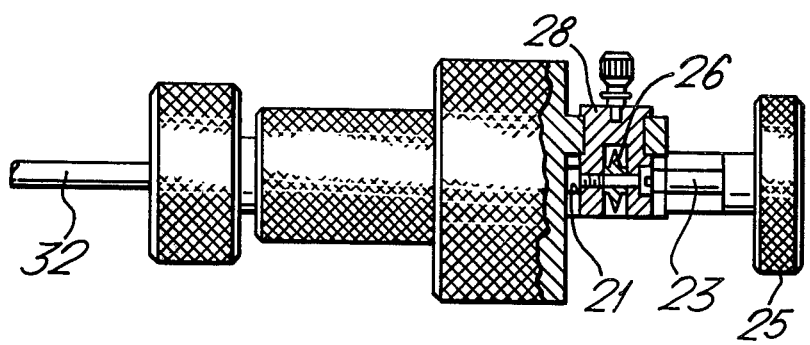
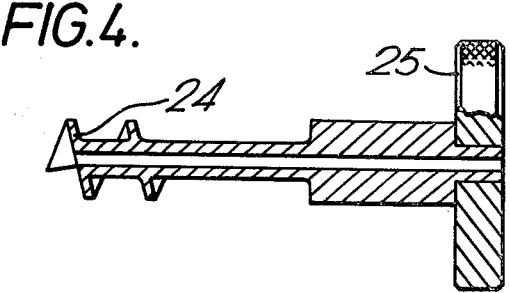

COAXIAL CABLE STRIPPING DEVICE

This is a continuation of application Ser. No. 812,926, filed July 5, 1977, now abandoned.

The invention relates to a device for removing the insulation from between the inner and outer conductors of a coaxial cable.

Devices for stripping the insulation from between inner and outer conductors of coaxial cables are known but require or produce destruction or severe distortion of the outer conductor or shield which is undesirable for some splicing operations.

According to the invention, the device comprises means to support a coaxial cable with the axis of an end portion rectilinear and a tubular insulation engaging bit mounted in alignment with the support means for rotary and reciprocal rectilinear movement relative to the axis of the end portion.

Rotation of the bit bores out the insulation from between the inner and outer conductors without significant distortion of the outer shield while the inner conductor is received within the bit.

Preferably the bit has a helical thread. Desirably, the device includes means to cut the outer conductor at a predetermined location.

The support means may include a channel for receiving the end portion and the bit may be located for movement along the channel. The cutting means may comprise a blade resiliently biased towards the channel mouth at a location spaced from the channel end.

The channel may be formed in a block rotatably mounted at one axial end on a cable gripping collet, the other axial end of the block having a bearing receiving the bit and the blade being slidably mounted on the block above the channel.

A specific example of the invention will now be described with reference to the accompanying drawings in which:

FIG. 1 is a cross-sectional view taken along the axis of a device according to the invention;

FIG. 2 is a cross-sectional view taken along lines 2—2 of FIG. 1;

FIG. 3 is a plan view partly in cross-section and,

FIG. 4 is a cross-sectional view of a suitable bit.

The device comprises a part cylindrical block 11 formed with an axial cable-receiving bore 12 and counter-bored at 13 to provide a bearing for a bush 14. The bush is rotatably mounted on roller bearing 15 and secured by an annular locknut 16. A cable-gripping collet 17 is threaded into the bush to constrict a split cable gripping end 19. A portion of the block remote from the collet is cut away to define a rectilinear cable locating channel 21 communicating with the bore 12 and extending into a neck 22. A tubular bit 23 is mounted in the neck for rectilinear and rotary movement in the channel and is provided with an external helical cutting thread 24 at one end, the other end being connected to a finger wheel 25.

A cutting wheel 26 is rotatably mounted on a pivot 27 in a carrier 28 slidably received in guides 30 on the block and biased towards the mouth of the channel by a spring 29. A locking screw 31 is provided, releasably to secure the wheel in different positions.

In one mode of operation, a cable 32 is threaded into the bore and channel and the collet tightened. The finger wheel is then operated causing the bit to sever the insulation 34 between the inner 35 and outer conductors (not shown). The cutting wheel is then secured adjacent the channel and the block rotated about the collet to cut through the outer conductor and insulation 33 (FIG. 1).

The shank of the bit supports the shield preventing distortion during cutting. The severed plastics strip is retained in the thread during the boring operation and removed as a single helical strip on withdrawing the bit.

Alternatively, the cutting wheel can be operated prior to the operation of the bit. After release of the collet, the cable can be withdrawn a short distance to strip the severed outer conductor and insulation from the inner conductor. The scrap is then removed from the channel and the cutting wheel pushed away to permit an unstripped portion of the cable to be advanced into the channel with the inner conductor received in the tubular bit. The collet can then be retightened and the finger wheel rotated.

What is claimed is:

1. A device for stripping insulation from between inner and outer conductors of coaxial cables, comprising, means having an axial channel of constant arcuate cross-section, open at both ends with one end adapted to receive and rigidly support a coaxial cable and the other end adapted to rotatably receive a tubular bit mounted concentrically with the channel axis and spaced inwardly from the channel wall, said bit having at one end a bore of substantially equal cross-sectional size to the conductor of a coaxial cable which may be inserted in said channel, and a helical thread of substantially equal height to the insulation thickness between the inner and outer conductors of said coaxial cable, said bit being mounted in generally exact alignment with the coaxial cable for non-gyrotory rotary and reciprocal rectilinear movement relative to the axis of the end portion to bore out the insulation between the inner and outer conductors without substantial deformation of the conductors.

2. A device for stripping insulation from between the inner and outer conductors of coaxial cables, comprising:
   a. support means having a channel open at both ends for receiving into one end an end portion of a coaxial cable;
   b. a tubular, insulation removing bit mounted in the channel's other open end for rotary and reciprocal rectilinear movement relative to the coaxial cable end portion; said bit having a helical thread; and
   c. a cutting blade mounted on the support means transversely of the channel and at a location spaced therefrom with means for resiliently biasing the blade towards the channel.

3. A device according to claim 2 in which the channel is formed in a block rotatably mounted at one axial end on a cable gripping collet, the other axial end of the block having a bearing receiving the bit, the blades being slidably mounted on the block above the channel.

* * * * *